United States Patent
Chen

(10) Patent No.: US 7,686,323 B2
(45) Date of Patent: Mar. 30, 2010

(54) BABY STROLLER WITH PORTABLE CRADLE

(76) Inventor: Ting-Yu Chen, 8F., No. 316, Sec. 2, Cinghai Rd., Situn District, Taichung City 407 (TW)

( * ) Notice: Subject to any disclaimer, the term of this patent is extended or adjusted under 35 U.S.C. 154(b) by 328 days.

(21) Appl. No.: 11/907,973

(22) Filed: Oct. 19, 2007

(65) Prior Publication Data

US 2009/0102162 A1 Apr. 23, 2009

(51) Int. Cl.
*B62B 1/00* (2006.01)
(52) U.S. Cl. ............... 280/642; 280/47.38; 280/647; 280/650; 280/658
(58) Field of Classification Search .............. None
See application file for complete search history.

(56) References Cited

U.S. PATENT DOCUMENTS

| 7,367,581 | B2 * | 5/2008 | Yang | 280/642 |
|---|---|---|---|---|
| 7,377,537 | B2 * | 5/2008 | Li | 280/650 |
| 7,401,803 | B1 * | 7/2008 | Lai | 280/647 |
| 7,441,794 | B2 * | 10/2008 | Lan | 280/642 |
| 2006/0061066 | A1 * | 3/2006 | Tan | 280/642 |
| 2007/0187914 | A1 * | 8/2007 | Jane Santamaria | 280/47.38 |
| 2007/0228697 | A1 * | 10/2007 | Miller et al. | 280/650 |
| 2008/0061533 | A1 * | 3/2008 | Li | 280/642 |
| 2008/0088116 | A1 * | 4/2008 | Den Boer | 280/650 |
| 2008/0296872 | A1 * | 12/2008 | Saville et al. | 280/642 |
| 2009/0121455 | A1 * | 5/2009 | Kretschmer et al. | 280/642 |

* cited by examiner

*Primary Examiner*—Paul N Dickson
*Assistant Examiner*—Erez Gurari

(57) ABSTRACT

A baby stroller includes a frame and a portable cradle is removably connected to the frame. The portable cradle includes two pivotal devices which are removably connected to two support devices on the frame. The pivotable device each includes a first part and a second part which is removably connected to a third part of the support device. A sleeve is movably mounted to the first part and connected to a pin which is inserted into a notch in the second part and one of positioning holes in a third part of the support device such that the portable cradle can be easily adjusted the inclination. The second part is removably connected to the third part of the support device. A front wheel assembly is connected to a front end of the frame of the stroller and the front wheel part is removably connected to the base of the front wheel assembly so that the front wheel part can be easily replaced.

6 Claims, 14 Drawing Sheets

BABY STROLLER WITH PORTABLE CRADLE

FIELD OF THE INVENTION

The present invention relates to a baby stroller with a portable cradle which is easily installed to and disengaged from the stroller.

BACKGROUND OF THE INVENTION

A conventional baby stroller and generally includes a frame with a front wheel assembly and a rear wheel assembly, a portable cradle is connected to the frame and can be separated from the frame of the stroller when needed. The connection to the portable cradle and the frame of the stroller is simple but not reliable. The portable cradle is simply directly inserted into tubes of the frame of the stroller so that the portable cradle is not well positioned. Even if the portable cradle is positioned to the frame of the stroller, a complicated mechanism is involved which is difficult to operate. Besides, some baby strollers have a flexible design for the front wheel assembly which can be changed to one-wheel assembly or two-wheel assembly. The high fabrication cost for the conventional front wheel assembly is an existed problem and is not improved.

The present invention intends to provide a baby stroller which includes a pivotal device and support device so as to well position the portable cradle and the portable cradle can also be adjusted its inclination. The front wheel assembly is also be improved and can be easily changed by one action.

SUMMARY OF THE INVENTION

The present invention relates to a baby stroller which comprises a frame and a portable cradle is removably connected to the frame. The portable cradle includes a cradle frame and two pivotal devices are connected to the cradle frame and each pivotal device includes a first part and a second part. A plurality of first insertions extend from each of the first parts and the cradle frame is connected to the first insertions. Each first part includes a first insertion hole defined in a tubular portion extending therefrom and a U-shaped handle is connected to the two first insertion holes. An outer groove and an inner groove are defined in a side of each of the first parts. One of the first insertions includes a space and a spring and a pin are located in the space. A passage is defined between the space and the outer groove and a notch is defined between the outer and inner grooves. A sleeve is movably mounted to the first insertion with the space and a rivet extends through the sleeve and the pin so that the sleeve is moved with the pin.

The second part includes a second insertion extending therefrom and the second insertion is connected to the frame of the stroller. The second part includes an annular flange which is engaged with the outer groove in the first part and a plurality of positioning holes are defined through the annular flange so that the pin is inserted one of the positioning holes. A front wheel assembly is connected to a front end of the frame of the stroller.

The primary object of the present invention is to provide a baby stroller which includes a portable cradle removably mounted thereon and the portable cradle can be disengaged from the frame of the stroller simply by pushing a collar.

Another object of the present invention is to provide a baby stroller wherein a front wheel assembly on the stroller can be easily replaced by pulling a button member on the base of the front wheel assembly.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
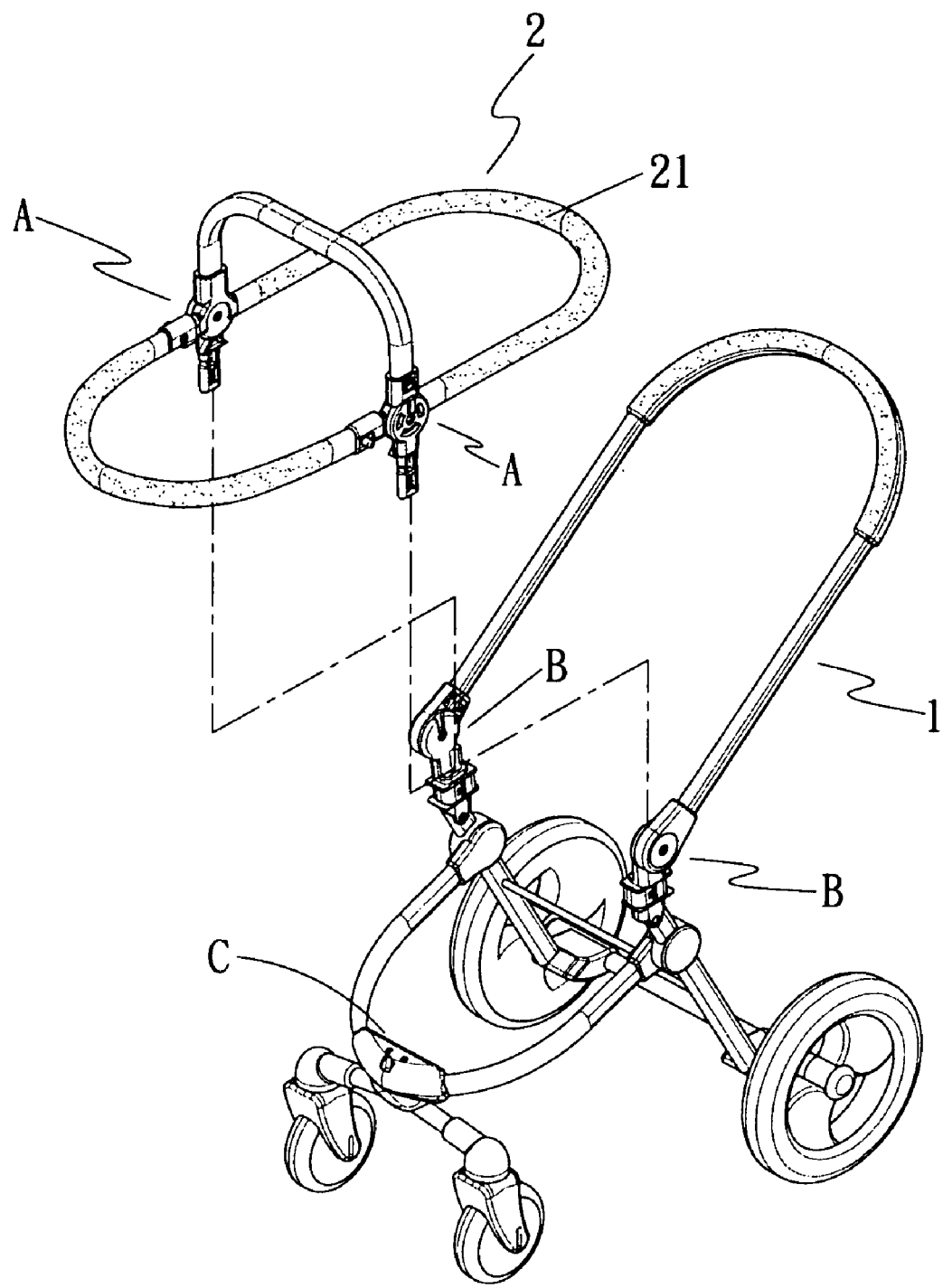
FIG. 1 is an exploded view to show the baby stroller and the portable cradle of the present invention.

Referring to FIGS. 1 to 6, the baby stroller of the present invention comprises a frame 1 having two rear wheels and a front wheel assembly "C" connected to a front end of the frame 1. Two support devices "B" are connected to the frame 1.

A portable cradle 2 is removably connected to the frame 1 and includes a cradle frame 21. Two pivotal devices "A" are connected to the cradle frame 21 and each include a first part 3 and a second part 4. Two first insertions 31 extend from each of the first parts 3 and the cradle frame 21 is connected to the first insertions 31. Each first part 3 includes a first insertion hole 32 defined in a tubular portion extending therefrom and a U-shaped handle (FIG. 1, not numbered) is connected to the two first insertion holes 32. An outer groove 33 and an inner groove 34 are defined in a side of each of the first parts 3 and a stop 341 is located in the inner groove 34 of the first part 3. One of the first insertions 31 has a space 311 defined therein and a through hole 312 is defined through the first insertion 31 and communicates with the space 311. A passage 313 is defined between the space 311 and the outer groove 33 and a notch 314 is defined between the outer and inner grooves 33, 34. A spring 35 and a pin 36 are located in the space 311, the pin 36 includes a ring at an end thereof. A sleeve 37 is movably mounted to the first insertion 31 which has the space 311 and a rivet 38 extends through the sleeve 37, the ring on the pin 36 and the through hole 312. A stub 371 extends from the sleeve 37 so that when pulling the stub 371, the sleeve 37 is moved with the pin 36 which can be pulled to be disengaged from the passage 313 and the notch 314.

The second part 4 includes a second insertion 41 extending therefrom and the second insertion 41 is to be connected to the support device "B" on the frame 1 of the stroller. An annular flange 42 extends from a side of the second part 4 and is engaged with the outer groove 33 in the first part 3. Two positioning holes 421 are defined through the annular flange 42 so that the pin 36 is inserted one of the positioning holes 421. A protrusion 43 extends from the second part 4 and is movably received in the inner groove 34 and will be stopped by the stop 341 when rotating the second part 4 relative to the first part 3.

Figure 4:
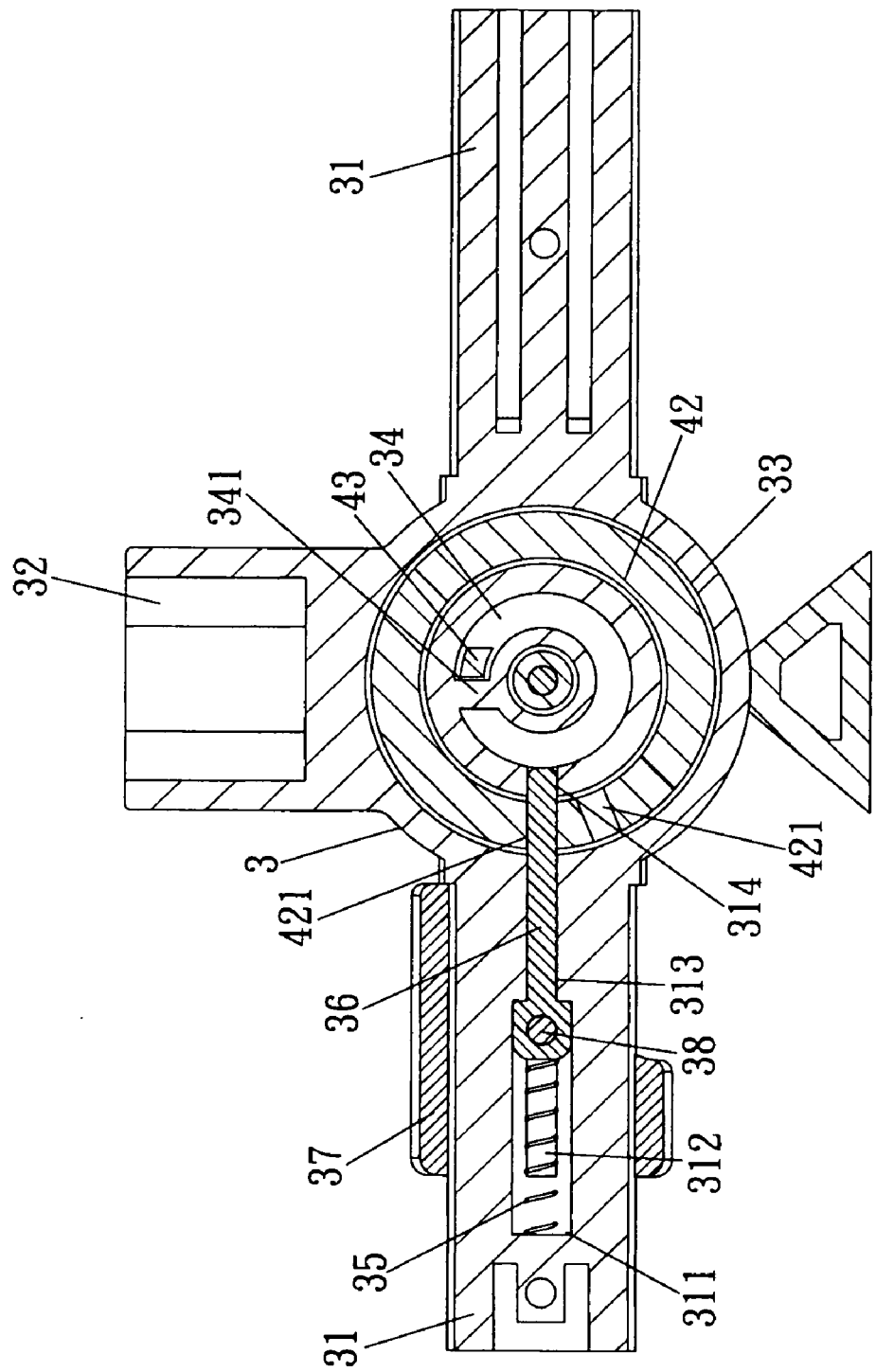
FIG. 4 is a cross sectional view to show the sleeve is connected to the first part of the present invention, wherein the pin is inserted into the positioning hole in the second part and the notch in the first part.
Figure 5:
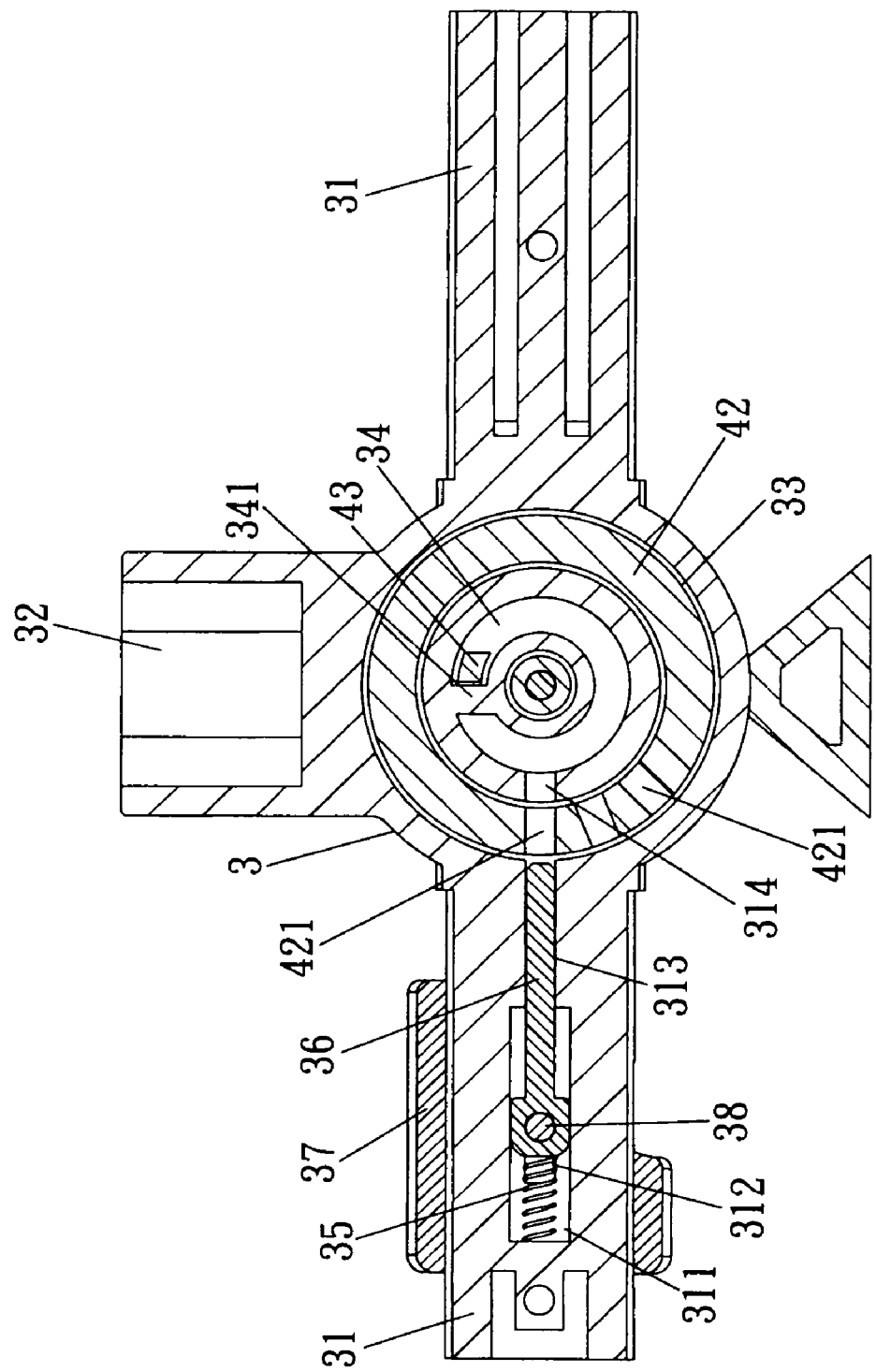
FIG. 5 is a cross sectional view to show that the pin is disengaged from the positioning hole in the second part and the notch in the first part.
Figure 6:
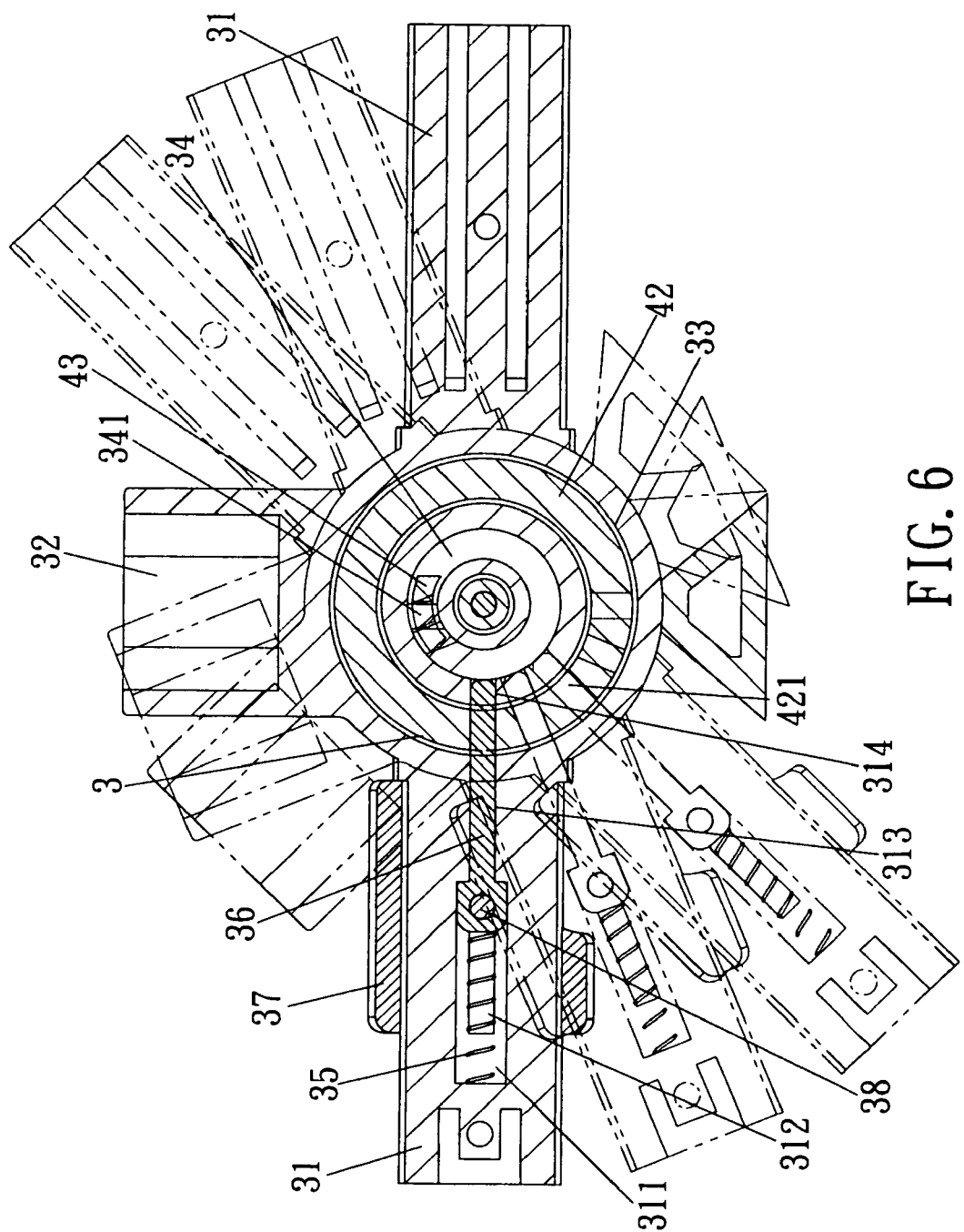
FIG. 6 is a cross sectional view to show that the portable cradle is pivoted relative to the second part.
Figure 7:
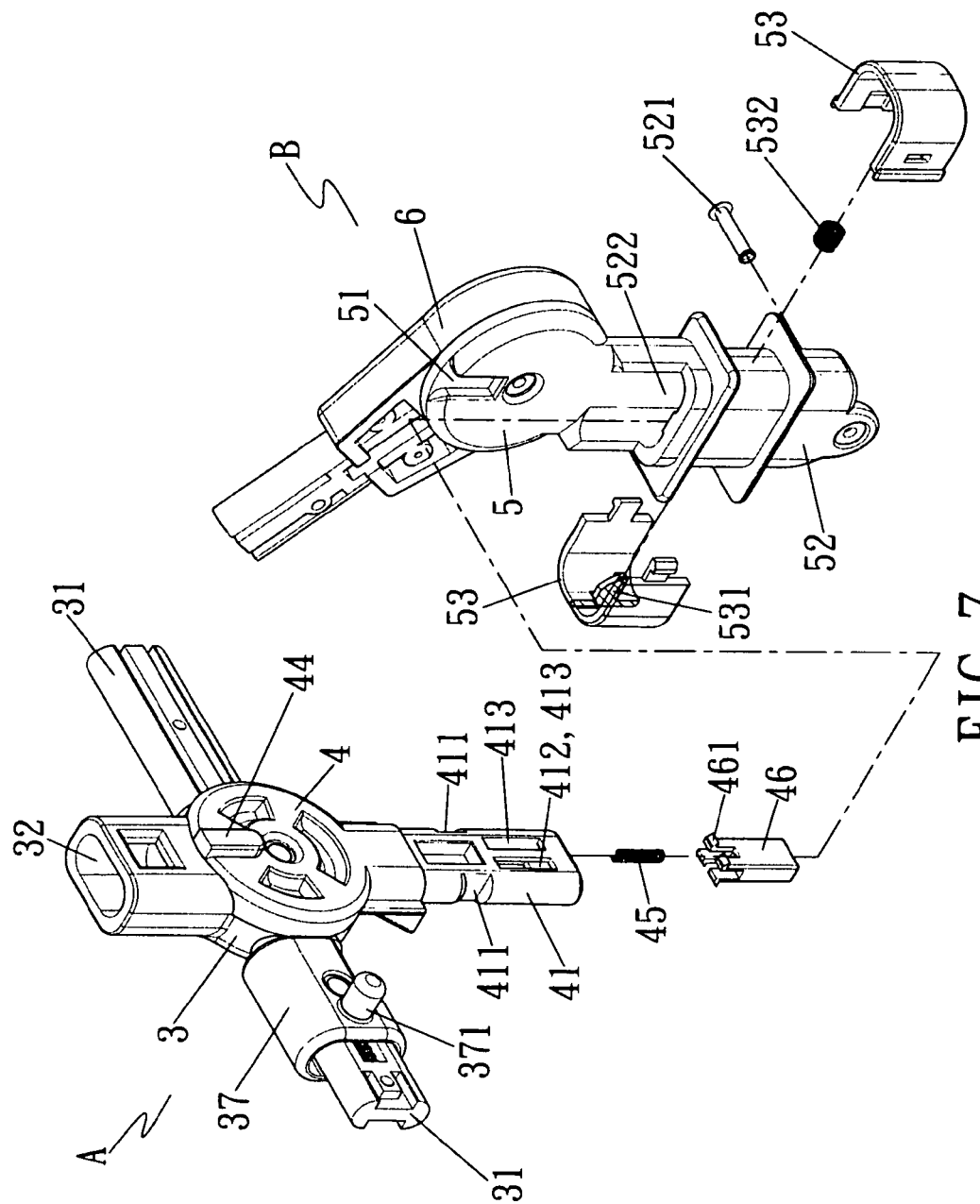
FIG. 7 is an exploded view to show the support device of the stroller of the present invention.
Figure 8:
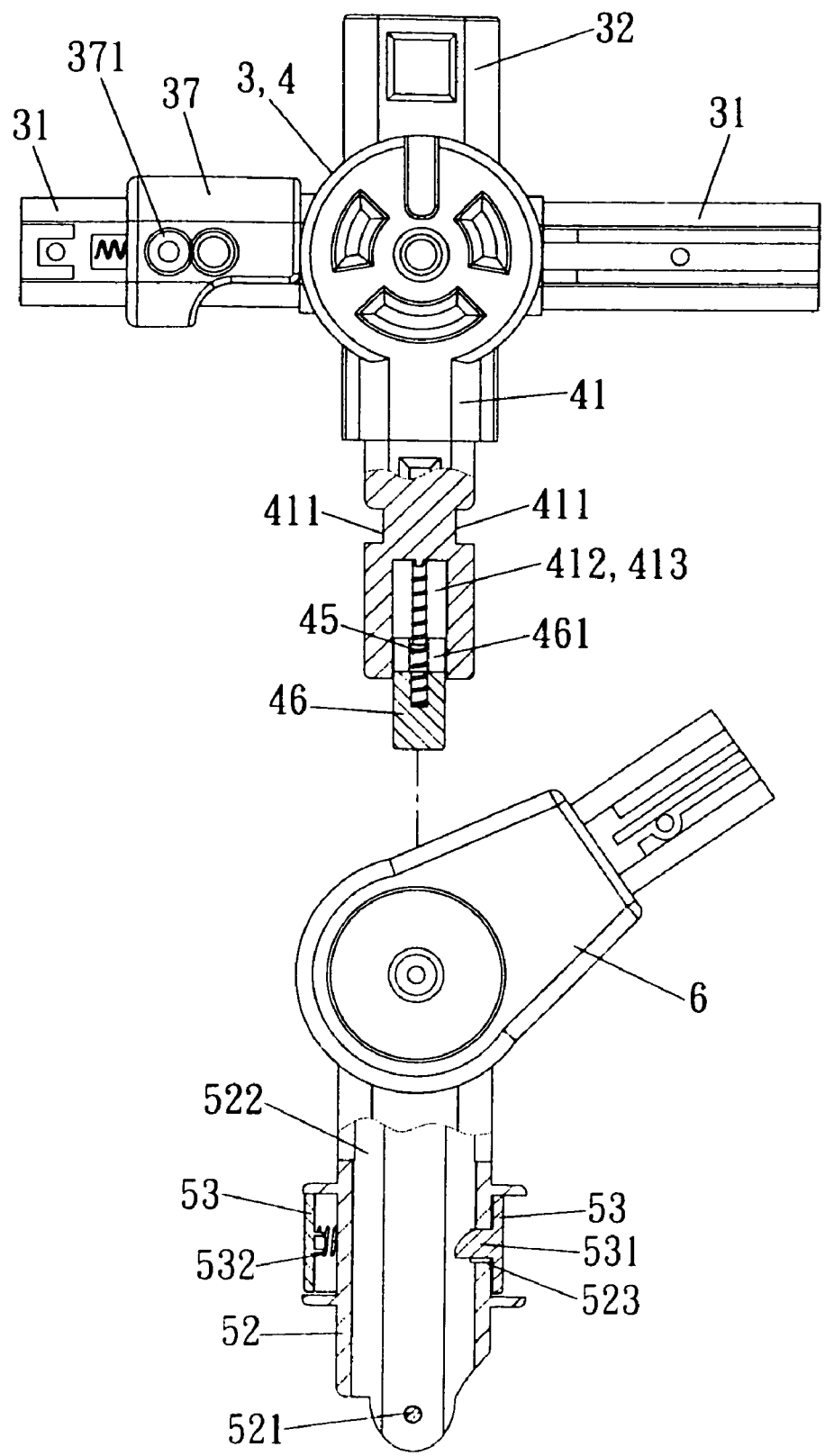
FIG. 8 is a partial cross sectional view to show the pivotal device is to be connected to the support device.

As shown in FIGS. 4 to 6, when adjusting the inclination of the portable cradle 2, the user simply pulls the stub 371 on the sleeve 37 to remove the pin 36 from the notch 314 and the positioning hole 421, the first part 3 together with the portable cradle 2 can be pivoted relative to the second part 4. When desired angular position is reached, the sleeve 37 is released and the pin 36 extends through the other positioning holes 421 and the notch 314 to set the position. The protrusion 43 is stopped by the stop 341 to prevent the portable cradle 2 to be overly rotated.

Figure 2:
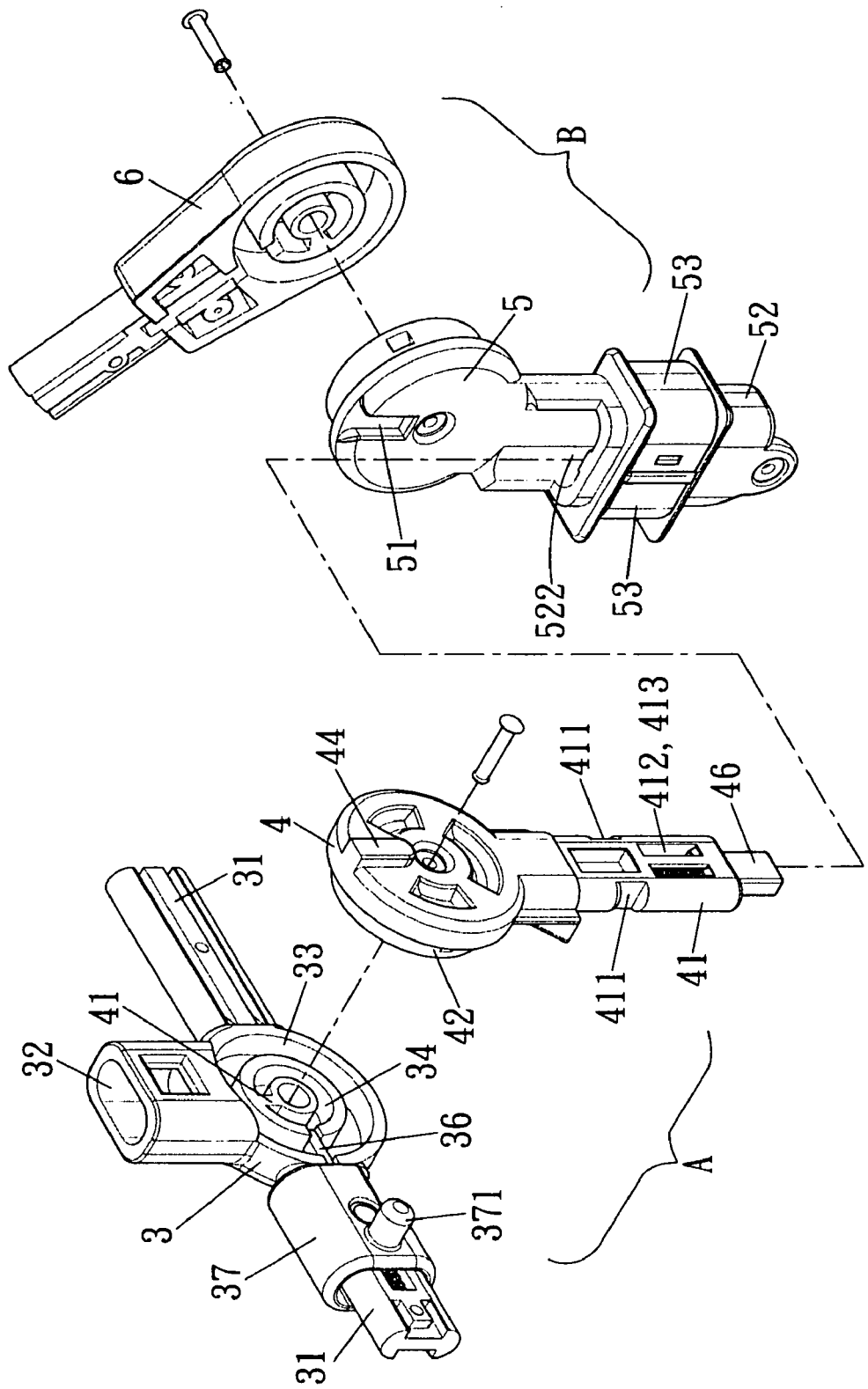
FIG. 2 is an exploded view to show the pivotal device and the support device of the present invention.
Figure 3:
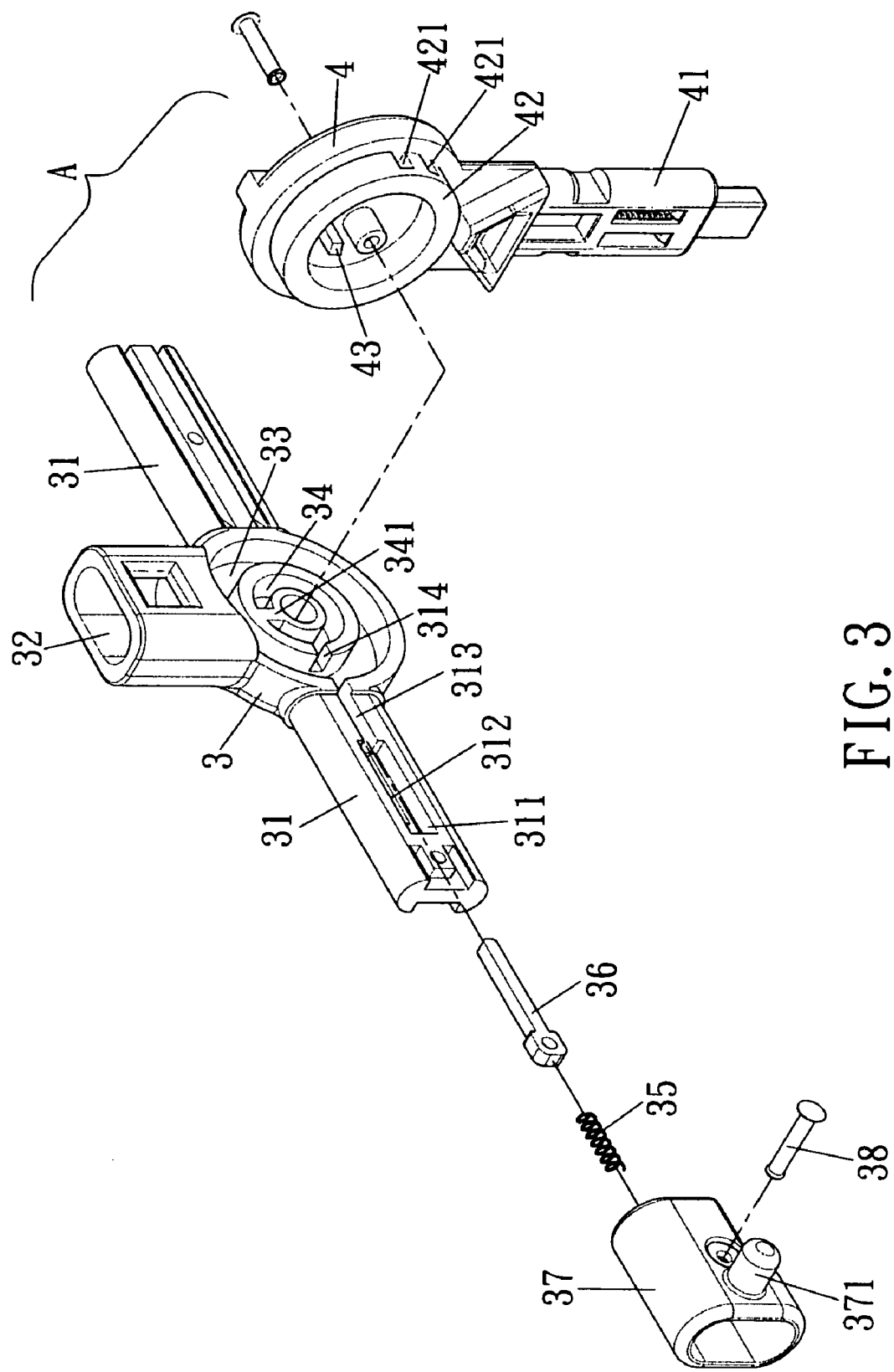
FIG. 3 is an exploded view to show the sleeve, the first part and the second part of the pivotal device of the present invention.

Referring to FIGS. 7-10, each support device "B" includes a third part 5 and a fourth part 6 which is connected to the third part 5 by a rivet as shown in FIG. 2, each third part 5 includes a connection tube 52 extending therefrom which is connected to the frame 1 of the stroller by a rivet 521. An insertion hole 522 is defined in the connection tube 52 and a communication hole 523 is defined through a wall of the connection tube 52 and communicates with the insertion hole 522. A collar 53 is mounted to the connection tube 52 and includes a plug 531 extending from a first inner end thereof and a spring 532 is connected to the other inner end of the collar 53. The plug 531 extends through the communication hole 523 and is inserted into the insertion hole 522, the spring 532 is biased between an outer surface of the connection tube 52 and the collar 53.

Figure 9:
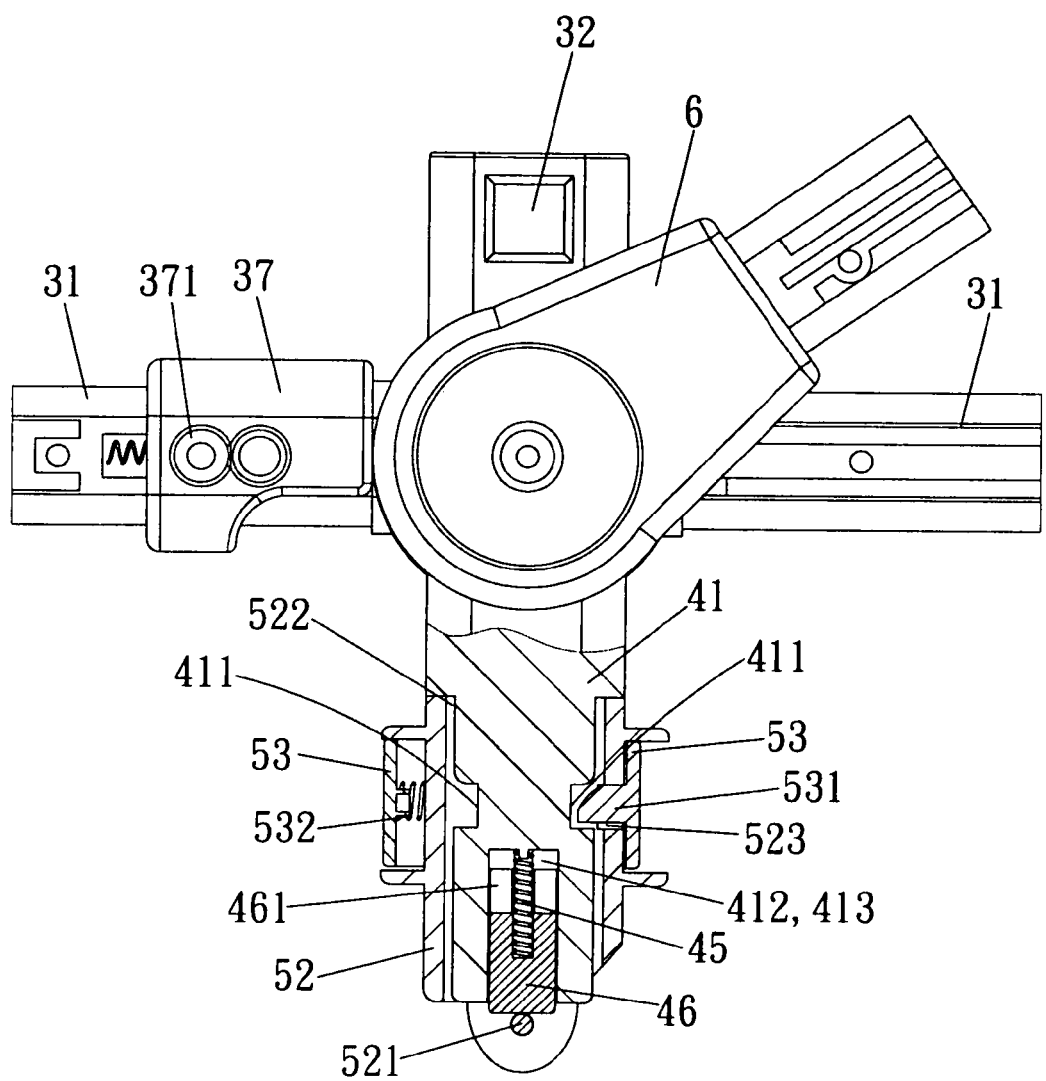
FIG. 9 is a partial cross sectional view to show the pivotal device is connected to the support device.

Two side notches 411 are defined in two sides of the second insertion 41 and a space 412 is defined in an underside of the second insertion 41, a plurality of elongate slots 413 are defined in an inside of the space 412. A spring 45 and a movable member 46 are received in the space 412, the movable member 46 includes a plurality of hooks 461 which are hooked to the elongate slots 413. The spring 45 biases the movable member 46 downward. The second insertion 41 of the second part 4 is inserted into the insertion hole 522 of the third part 3, the plug 531 is engaged with the side notches 411 of the second insertion 41 and the movable member 46 is stopped by the rivet 521 so that the spring 45 is compressed as shown in FIG. 9. A radial groove 51 is defined in the third part 5 and a block 44 extends from the second part 4, the block 44 is engaged with the radial groove 51.

Figure 10:
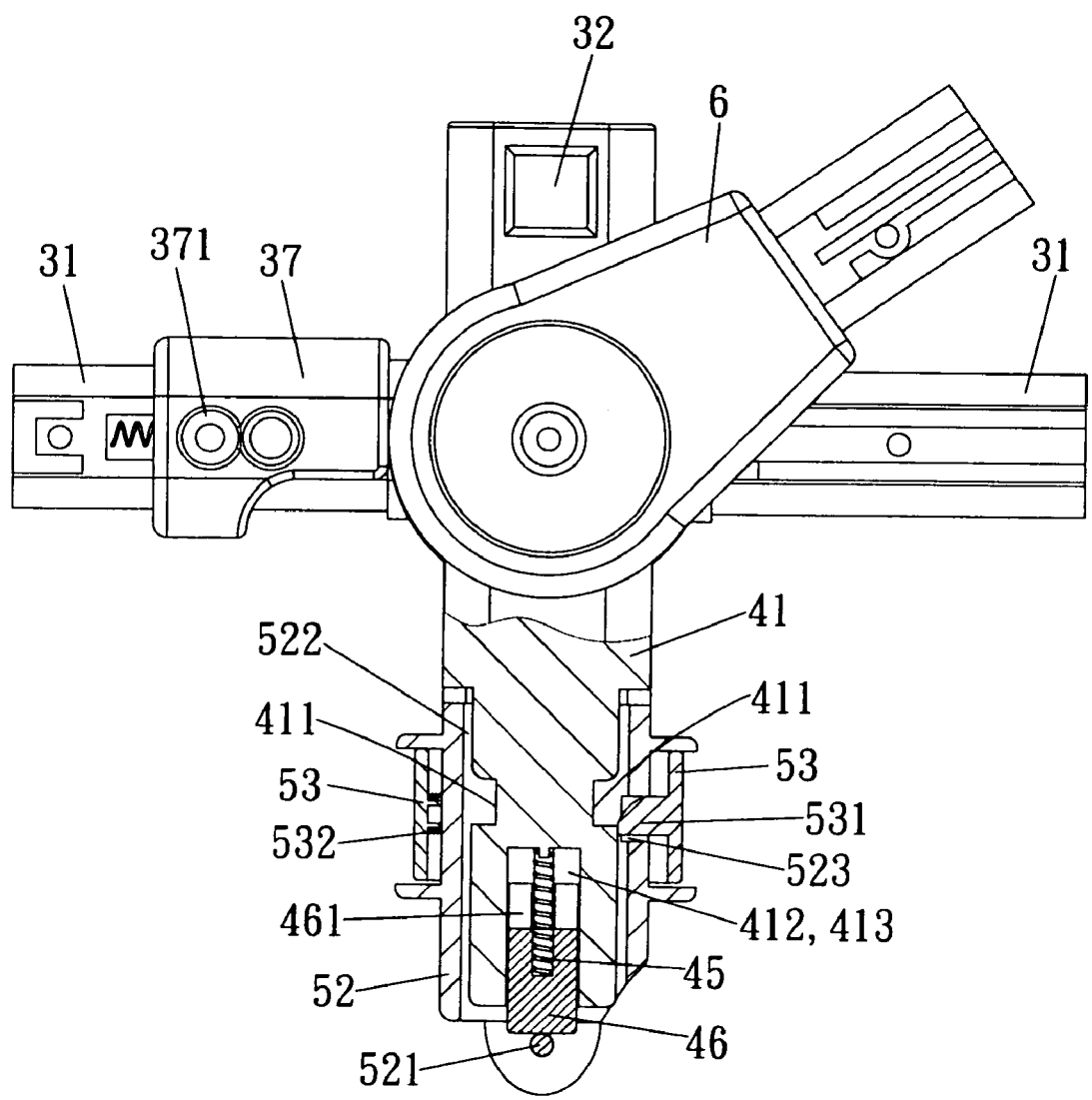
FIG. 10 is a partial cross sectional view to show that the collar is pushed to remove the plug of the roller from the side notches of the second insertion.
Figure 11:
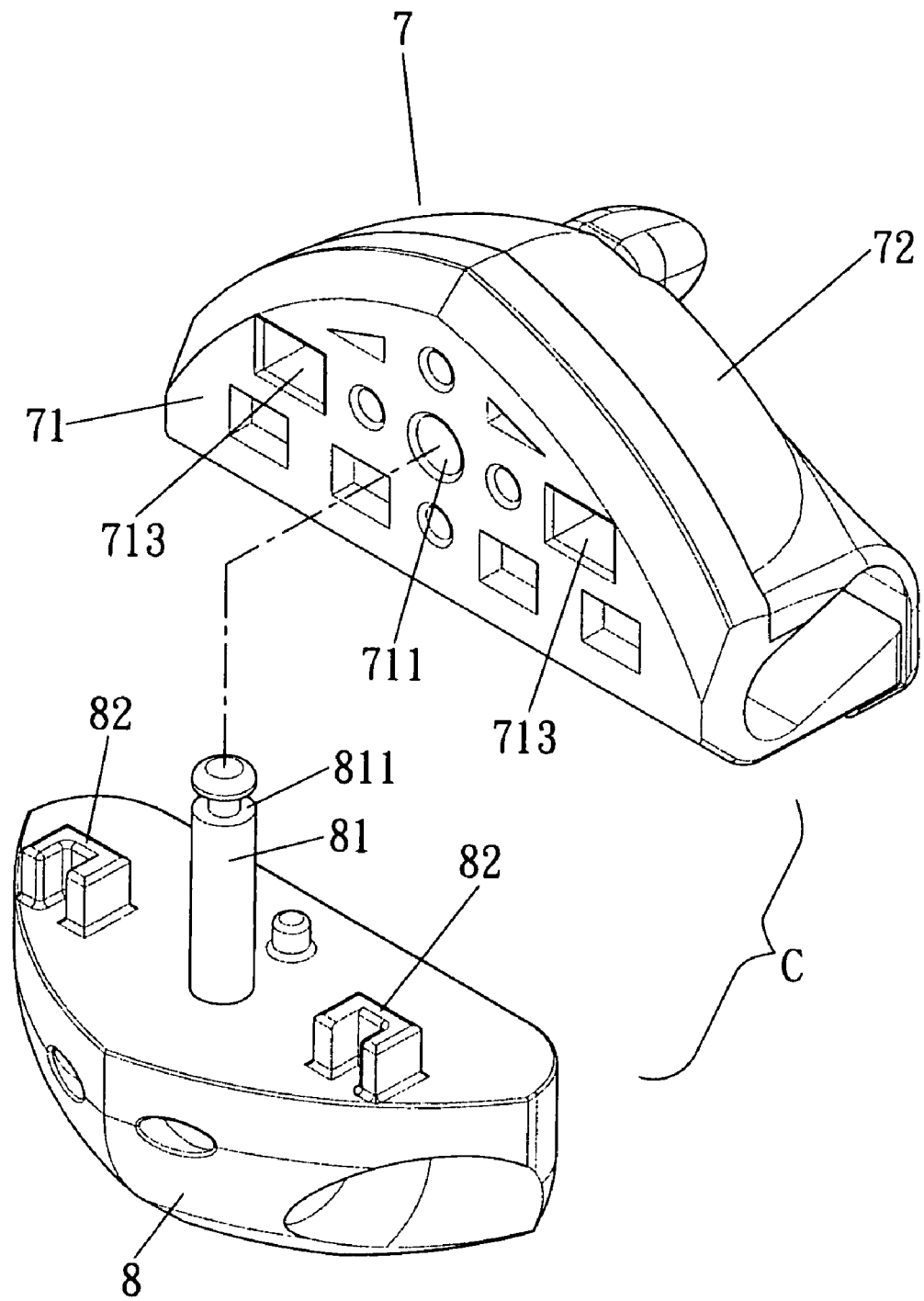
FIG. 11 is an exploded view to show the front wheel assembly.
Figure 12:
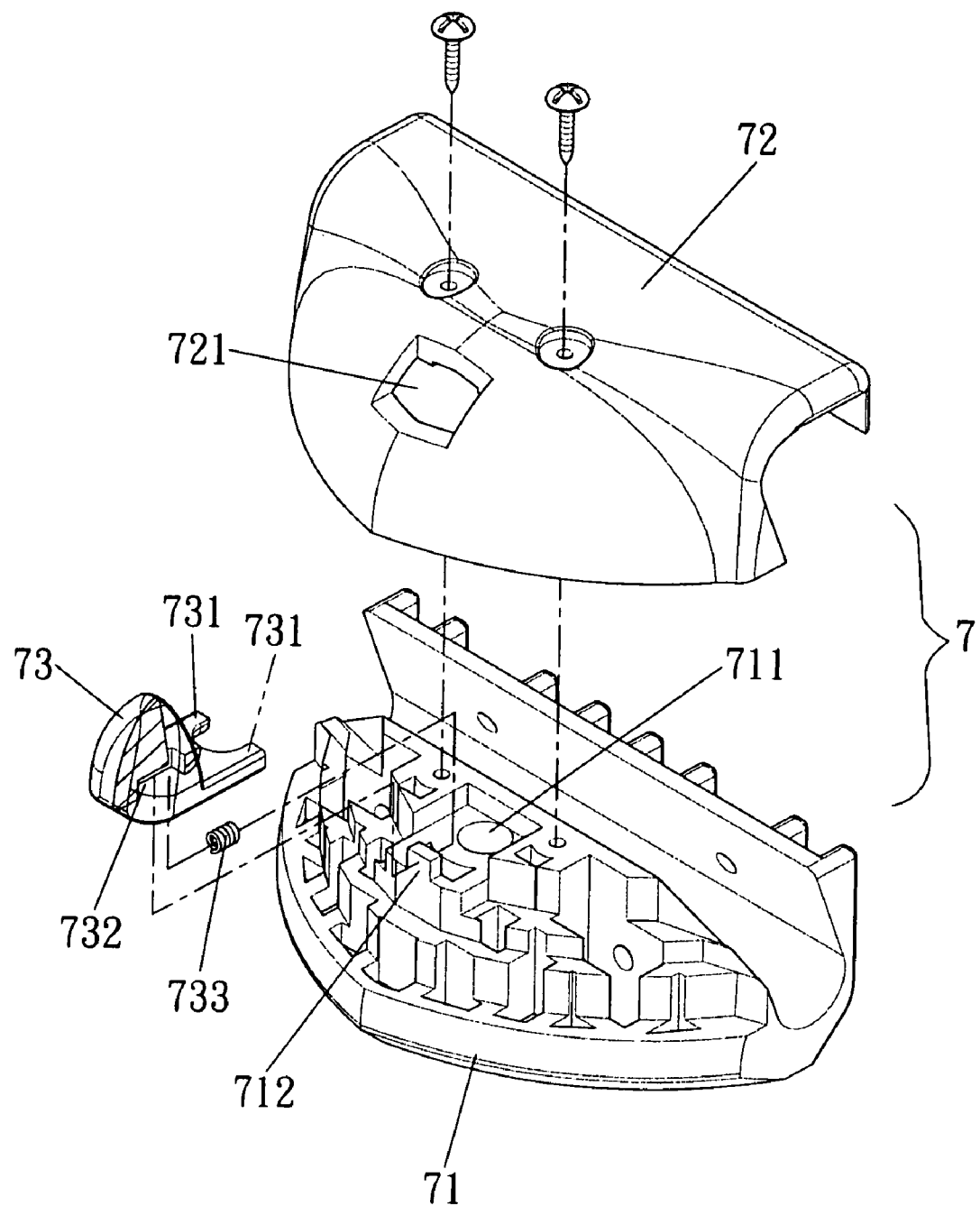
FIG. 12 is an exploded view to show the top cover, the button member and the connection base of the front wheel assembly.
Figure 13:
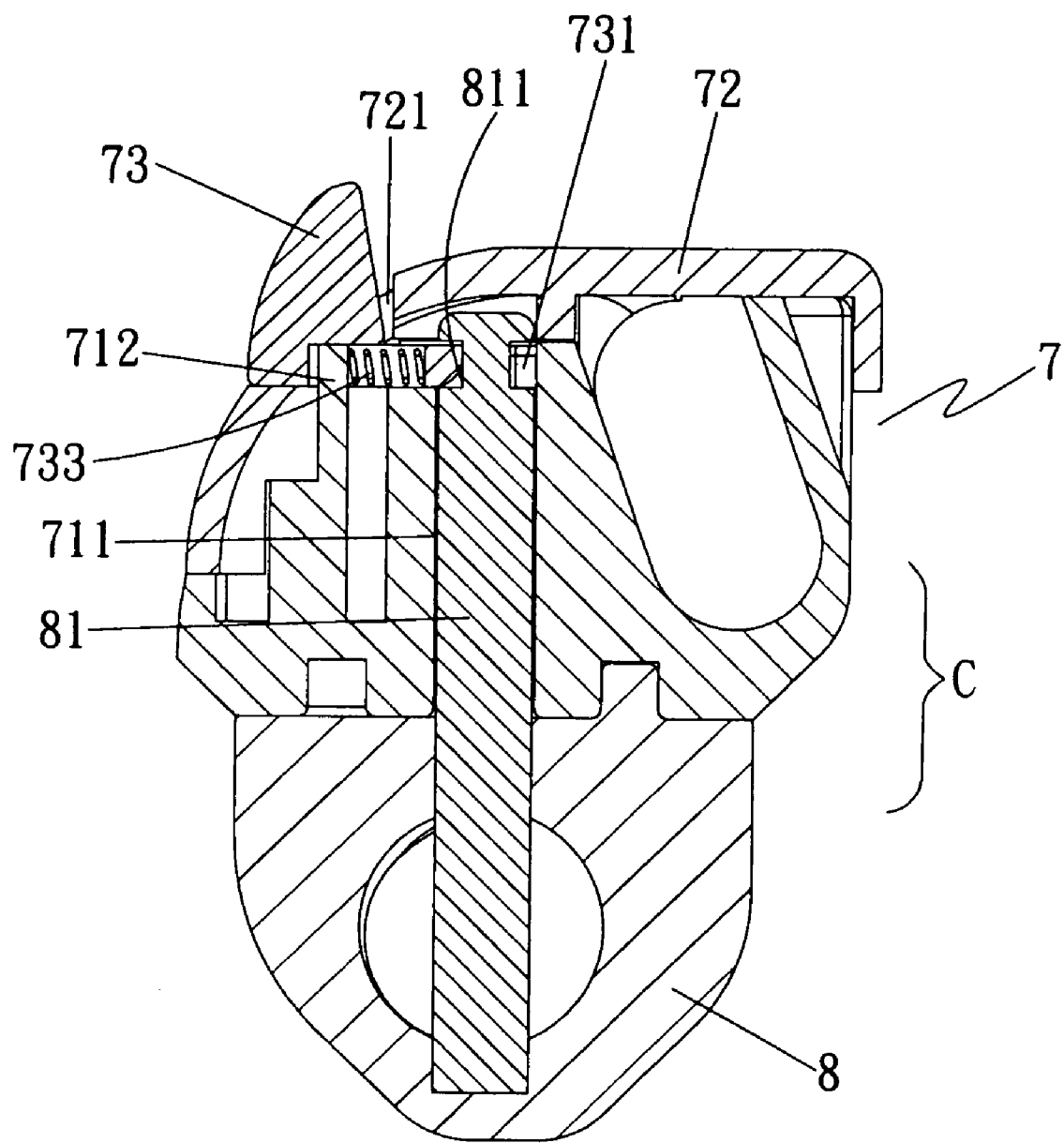
FIG. 13 is a cross sectional view to show the connection base is connected to the front wheel part by the button member.
Figure 14:
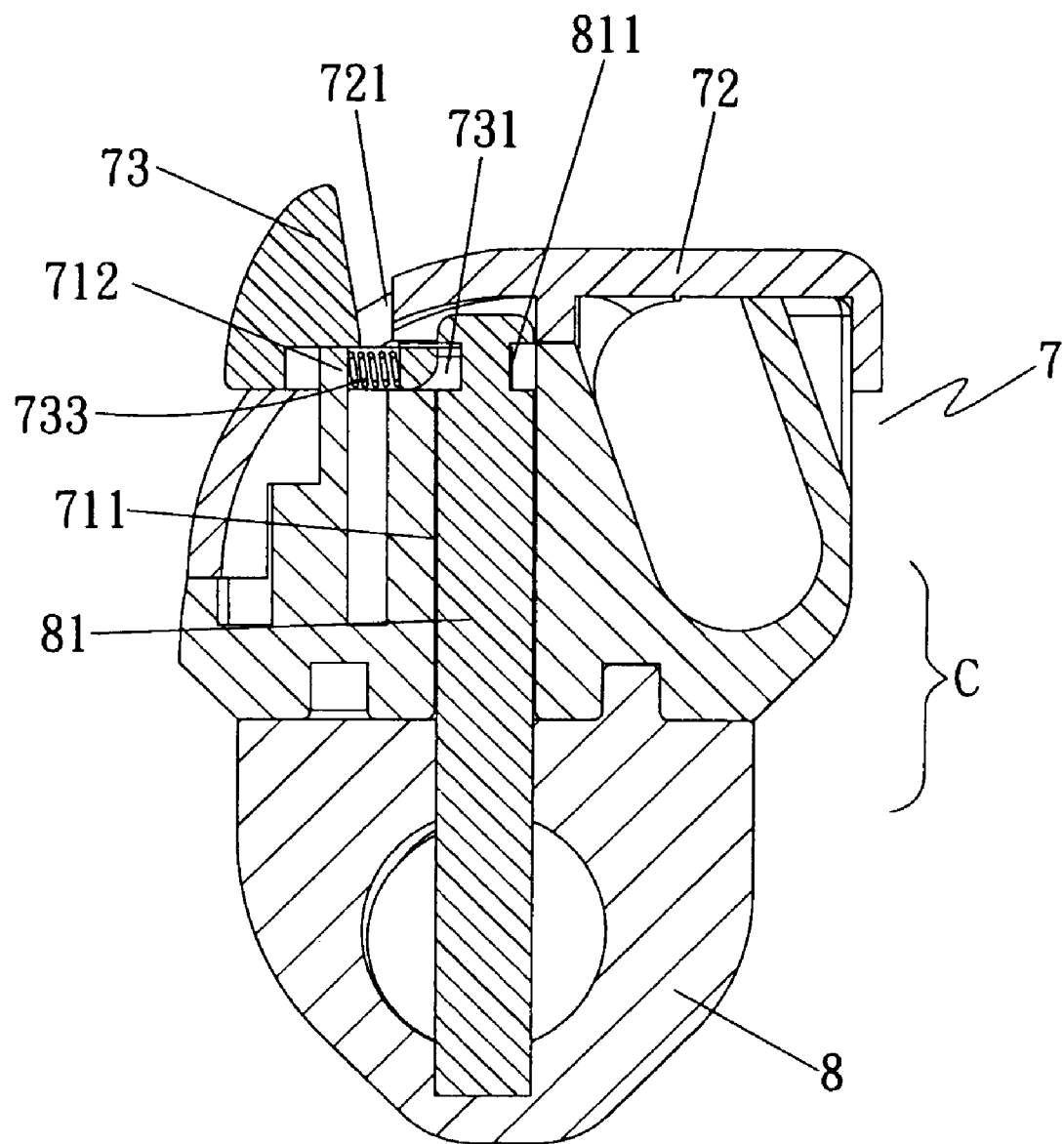
FIG. 14 is a cross sectional view to show that the button member is pulled so that the connection base and the front wheel part can be separated from each other.

As shown in FIG. 10, when separating the portable cradle 2 from the frame 1 of the stroller, the collar 53 is pushed to compress the spring 532 so that the plug 531 is disengaged from the side notch 411 in the second insertion 41. The spring 45 then pushes the second insertion 41 to remove the second insertion 41 from the insertion hole 522 in the connection tube 52, the user can easily lift the portable cradle 2 from the frame 1 of the stroller.

The front wheel assembly "C" includes a base 7 fixed to the front end of the frame 1 of the stroller and a front wheel part 8 is connected to the base 7. The base 7 includes a connection base 71 which is fixed to the front end of the frame 1 and a top cover 72 which is mounted to the connection base 71. The connection base 71 includes a connection hole 711 and a stop plate 712 is located in front of the connection hole 711. A button member 73 is mounted to the stop plate 712 and includes two arms 731, a concavity 732 is defined in an underside of the button member 73 and a spring 733 is located in the concavity 732. The spring 733 is biased between the stop plate 712 and an inside of the concavity 732. The connection base 71 includes a plurality of recesses 713.

Referring to FIGS. 11-14, the front wheel part 8 is mounted to the connection base 71 and includes an opening 721 through which the button member 73 extends. The front wheel part 8 is connected to the front wheels and a connection bar 81 and positioning protrusions 82 extend from a top of the front wheel part 8. The connection bar 81 is inserted into the connection hole 711 of the connection base 71 and the positioning protrusions 82 are inserted into the recesses 713 of the connection base 71. The connection bar 81 includes a shrink section 811, the arms 731 of the button member 73 are removably engaged with the shrink section 811.

When the button member 73 is pulled, the arms 731 are disengaged from the shrink section 811 and the front wheel part 8 can be removed from the connection base 71. Another front wheel part 8 can be easily connected to the connection base 71 to switch the front wheel part 8 from two front wheels to one front wheel.

While we have shown and described the embodiment in accordance with the present invention, it should be clear to those skilled in the art that further embodiments may be made without departing from the scope of the present invention.

What is claimed is:
1. A baby stroller comprising:
a frame (1);
a portable cradle (2) removably connected to the frame (1) and including a cradle frame (21), two pivotal devices (A) connected to the cradle frame (21) and each including a first part (3) and a second part (4), a plurality of first insertions (31) extending from each of the first parts (3) and the cradle frame (21) connected to the first insertions (31), each first part (3) having a first insertion hole (32) defined in a tubular portion extending therefrom and a U-shaped handle being connected to the two first insertion holes (32), an outer groove (33) and an inner groove (34) defined in a side of each of the first parts (3), one of the first insertions (31) having a space (311) defined therein and a through hole (312) defined through the first insertion (31) and communicating with the space (311), a passage (313) defined between the space (311) and the outer groove (33) and a notch (314) defined between the outer and inner grooves (33, 34), a spring (35) and a pin (36) located in the space (311), a sleeve (37) movably mounted to the first insertion (31) with the space (311) and a rivet (38) extending through the sleeve (37), the pin (36) and the through hole (312) so that the sleeve (37) is moved with the pin (36), the second part (4) having a second insertion (41) extending therefrom and the second insertion (41) connected to the frame (1) of the stroller, the second part (4) having an annular flange (42) which is engaged with the outer groove (33) in the first part (3) and a plurality of positioning holes (421) defined through the annular flange (42) so that the pin (36) is inserted one of the positioning holes (421), and a front wheel assembly (C) connected to a front end of the frame (1) of the stroller.

2. The stroller as claimed in claim 1, wherein a stop (341) is located in the inner groove (34) of the first part (3) and a protrusion (43) extends from the second part (4), the protrusion (43) is movably received in the inner groove (34) and stopped by the stop (341) when rotating the second part (4) relative to the first part (3).

3. The stroller as claimed in claim 1, wherein a stub (371) extends from the sleeve (37).

4. The stroller as claimed in claim 1, wherein the frame (1) of the stroller includes two support devices (B) to which the pivotal devices (A) are connected, each support device (B) includes a third part (5) and a fourth part (6), each third part (5) includes a connection tube (52) extending therefrom which is connected to the frame (1) of the stroller by a rivet (521), an insertion hole (522) is defined in the connection tube (52) and a communication hole (523) is defined through a wall of the connection tube (52) and communicates with the insertion hole (522), a collar (53) is mounted to the connection tube (52) and includes a plug (531) extending from a first inner end thereof and a spring (532) is connected to the other inner end of the collar (53), the plug (531) extends through the communication hole (523) and is inserted into the insertion hole (522), the spring (532) is biased between an outer surface of the connection tube (52) and the collar (53), two side notches (411) are defined in two sides of the second insertion (41), a space (412) is defined in an underside of the second insertion (41) and a plurality of elongate slots (413) are defined in an inside of the space (412), a spring (45) and a movable member (46) are received in the space (412), the movable member (46) includes a plurality of hooks (461) which are hooked to the elongate slots (413), the spring (45) biases the movable member (46) downward, the second insertion (41) of the second part (4) is inserted into the insertion hole (522) of the third part (3), the plug (531) is engaged with the side notches (411) of the second insertion (41).

5. The stroller as claimed in claim 4, wherein a radial groove (51) is defined in the third part (5) and a block (44) extends from the second part (4), the block (44) is engaged with the radial groove (51).

6. The stroller as claimed in claim 1, wherein the front wheel assembly (C) includes a base (7) fixed to the front end of the frame (1) of the stroller and a front wheel part (8) is connected to the base (7), the base (7) includes a connection base (71) which is fixed to the front end of the frame (1) and a top cover (72) which is mounted to the connection base (71), the connection base (71) includes a connection hole (711) and a stop plate (712) is located in front of the connection hole (711), a button member (73) is mounted to the stop plate (712) and includes two arms (731), a concavity (732) is defined in an underside of the button member (73) and a spring (733) is located in the concavity (732), the spring (733) is biased between the stop plate (712) and an inside of the concavity (732), the connection base (71) includes a plurality of recesses (713), the front wheel part (8) is mounted to the connection base (71) and includes an opening (721) through which the button member (73) extends, the front wheel part (8) is connected to front wheels and a connection bar (81) and positioning protrusions (82) extend from a top of the front wheel part (8), the connection bar (81) is inserted into the connection hole (711) of the connection base (71) and the positioning protrusions (82) are inserted into the recesses (713) of the connection base (71), the connection bar (81) includes a shrink section (811), the arms (731) of the button member (73) are removably engaged with the shrink section (811).

\* \* \* \* \*